April 19, 1938. J. F. BRENNAN Re. 20,699

WASHING APPARATUS

Original Filed April 3, 1934 2 Sheets-Sheet 1

Inventor

Joseph F. Brennan

By Clarence A. O'Brien

Attorney

April 19, 1938. J. F. BRENNAN Re. 20,699

WASHING APPARATUS

Original Filed April 3, 1934 2 Sheets-Sheet 2

Inventor
Joseph F. Brennan

By Clarence A. O'Brien
Attorney

Reissued Apr. 19, 1938

Re. 20,699

UNITED STATES PATENT OFFICE 20,699

WASHING APPARATUS

Joseph F. Brennan, Yeadon, Pa., assignor, by direct and mesne assignments, of one-half to Douglas A. Wilson and one-half to R. B. La Porte, both of Peoria, Ill.

Original No. 1,983,788, dated December 11, 1934, Serial No. 718,853, April 3, 1934, Application for reissue August 30, 1935, Serial No. 39,452

19 Claims. (Cl. 68—53)

This invention relates to an improved washing machine wherein clothes, fabrics and various similar materials of all kinds are immersed into a cleansing liquid such as water in the tub, agitated back and forth with the water by a submerged agitating element, and simultaneously with the movement of said agitating element subjected to the action of air under pressure discharged into the water agitated by the liquid impelling surfaces thereof, whereby said fabrics are urged thereby out of substantial contact therewith and said commingled air and liquid being caused to travel through and around said fabrics, thus assisting in the active suspensioning of said fabrics in said liquid and at the same time aerating and cleansing the same.

The invention has further reference to provide an attachment particularly adapted for washing tubs or containers and consists in the provision of a suitably driven agitator or liquid impelling mechanism and supporting means therefor, all of which, as a unit may be readily supported between the side walls of the tub in a manner to employ said agitator for washing and cleansing purposes.

A still further object of the invention is to provide an attachment of this character which is economical in construction and operation, enabling quick attachment to and detachment from said tub or container, and which will give the user advantages in the use of particularly stationary tubs for washing and cleansing such materials as are for the most part only enjoyed by users of regularly manufactured power driven washing machines.

The invention together with its objects and advantages will be best understood from a study of the following description taken in connection with the accompanying drawings, wherein.

Figure 1:
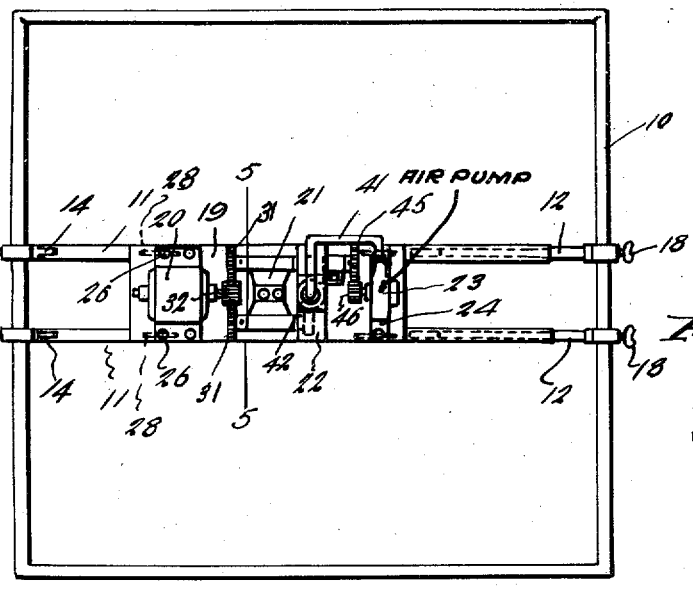
Fig. 1 is a top plan view illustrating the application of said invention.
Figure 2:
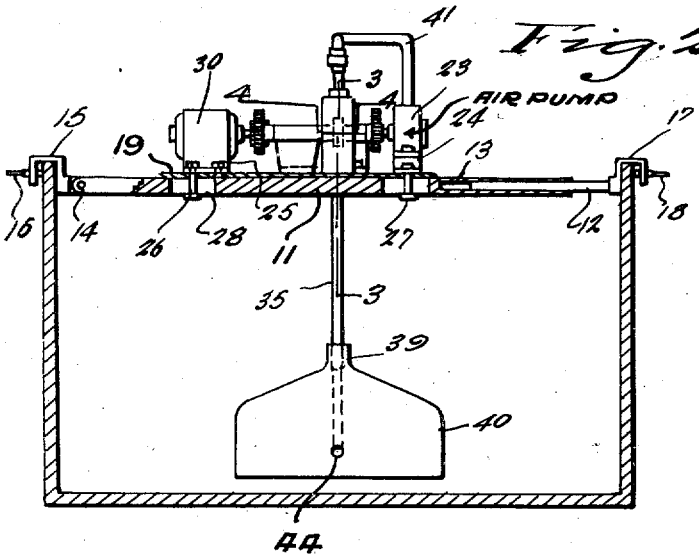
Fig. 2 is a vertical sectional view, certain parts being shown in elevation and other parts broken away.
Figure 3:
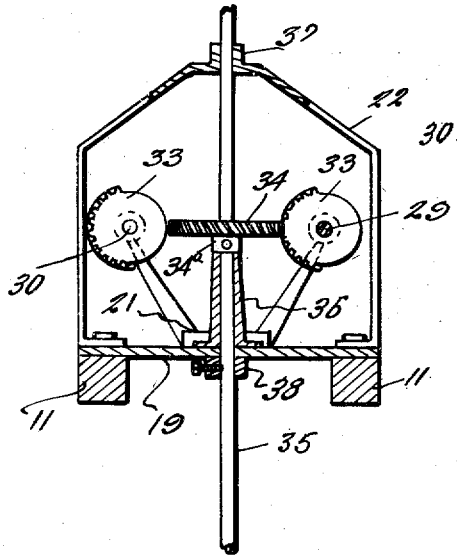
Figure 5:
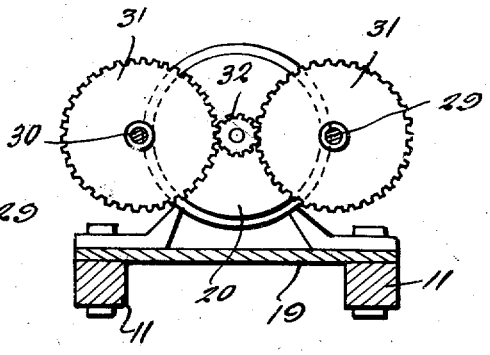
Figure 4:
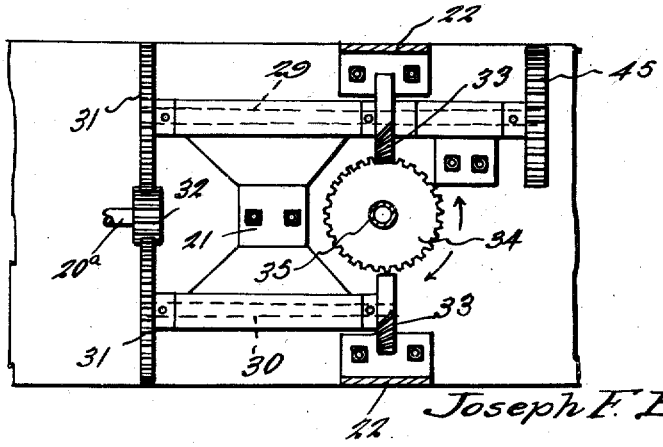

Figs. 3 and 4 are sectional views taken substantially on the lines 3—3 and 4—4, respectively, of Fig. 2;

Fig. 5 is a sectional view taken substantially on the line 5—5 of Fig. 1, and

Figure 6:
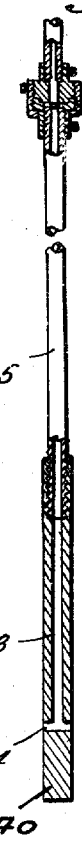

Fig. 6 is an enlarged view through the agitator, agitator shaft and swivel connection between said shaft and the conduit or duct leading from the air pump, illustrating the line of travel of said air from said conduit through the agitator shaft, into the communicating ducts of the agitator and out through the egress openings thereof, certain parts being shown in elevation and others broken away and shown in section.

Referring to the drawings by reference numerals, it will be seen that 10 indicates generally one section or part of a stationary wash tub or container having the usual opening at the top thereof, vertical side walls and a bottom wall, the interior surfaces of which are shown substantially smooth and uninterrupted, although it is to be understood that it is not in any wise intended to limit the invention to use with this particular type and character of tub.

The device per se comprises a supporting frame consisting of relatively fixed and spaced side members 11—11 and relatively slidable and spaced side members or sections 12—12 that are preferably non-circular in cross section and have slidable engagement with elongated non-circular sockets 13 provided in one end of the side sections or members 11—11.

At the other end thereof the sections or members 11—11 have hinged or pivoted thereto, as at 14, clamps 15 that are adapted to straddle the upper edge of one side wall of the tub, and these clamps are provided with securing thumb screws 16, as shown. The side sections or members 12—12 at their free ends are provided with clamps 17, similar to the clamps 15 and said clamps 17 are also provided with securing thumb screws 18.

Mounted on said supporting frame is a platform or carriage 19 and mounted on said carriage is a power driving means, such as an electric motor 20, the source of electrical current and connections to said motor not being shown; also, on said carriage, a bearing block 21, guide frame 22, a pump 23 for pumping air, and a pedestal 24 for said pump.

The base of the motor 20 is secured to the platform 19 through the medium of bolt and nut means 25 and 26. The pedestal for the pump 23 is secured to the platform 19 through the medium of bolt and nut means 27 and it will be seen that the bolts 26, 27 operate in slot openings 28 provided therefor in the side members 11 of said supporting frame. Thus it will be seen that the platform 19 may be adjusted longitudinally of the members of the frame for adjustably locating or centering the liquid impelling element or agitator within and substantially centrally of the walls of the tub, as may be required to meet the adjustments of the supporting frame necessary to properly mount said device on a washing tub or container. In this connection, it will be understood that washing tubs may vary in size or diameter, so to speak, and that from the above, provision has been amply made to meet the requirement of the particular washing tub with which the device is to be used.

As clearly shown in Fig. 4, there are journaled in the bearings of the block 21 shafts 29, 30 and on one end of these shafts are gear wheels 31 that are arranged in constant mesh with a pinion gear 32 on the driving shaft 20a of the motor 20.

Also mounted on the shafts 29, 30 are segmental spiral gears 33 that are adapted to alternately mesh with a spiral gear wheel 34 that is suitably secured to the agitator shaft 35. As clearly shown in Fig. 3, the agitator shaft 35 is journaled in a bearing 36 rising from the platform 19 and in a bearing 37 provided in the top portion of the guide frame 22. The agitator shaft 35 is held against vertical movement through the medium of the hub 34a of the gear 34 resting on the upper end of the bearing 36 and a collar 38 suitably secured to the agitator shaft beneath the platform or carriage 19.

From the description, thus far, it will be seen that a power drive is transmitted from the motor 20 through the gearing 31, 32 to the shafts 29, 30, and by reason of first one gear 33 meshing with the gear 34 and then a second like gear 33 meshing with said gear 34, an oscillatory movement is imparted to the vertically disposed agitator shaft 35, it being apparent that through the provision of the gearing 33, 34, said shaft 35 is first rotated in one direction and then in a reverse direction, as indicated by the arrows in Fig. 4.

The lower end of the agitator shaft 35 is preferably threaded to screw-threadedly receive and support a collar or supporting portion 39 with which is associated the liquid impelling element or agitator member 40, illustrated herein as comprising a bladed member having opposed radially disposed wings or vanes whereby to agitate the cleansing liquid, as determined by the speed of the motor 20 and the connecting gearing, and thereby thoroughly clean and wash said fabrics or materials.

As before intimated, the pump 23 is adapted for forcing air under pressure into the water in the tub, and in the preferred form of the invention, the outlet side of the pump 23 is provided with a conduit 41, that at its free end is swivelly connected as at 42 with the upper end of the agitator shaft 35. Shaft 35, as shown in Fig. 6, is hollow throughout the length thereof to provide a communicating air conduit or duct that is in line with an air communicating conduit or duct 43 provided in any suitable manner in the agitator member 40 and opening out adjacent the lower portion or edge and on opposite sides thereof through the medium of the egress or outlet passages or openings 44. It will thus be understood, that air under pressure will be forced from the pump 23 through the conduit 41, thence into the hollow passageway of the agitator shaft 35 and thence into the communicating conduit or duct in the collar or supporting portion 39 and thence into the communicating conduit or duct 43 in the agitator member 40 and discharged therefrom through the egress openings or passages 44 located on opposite sides of the impelling surfaces of the agitator during operation thereof by means of said power driving means or motor 20.

For driving the pump 23, there is suitably mounted on one end of the shaft 29 a gear 45 that is disposed in constant mesh with a pinion gear 46 provided on the outer end of the pressure building driving shaft of said pump whereby air is discharged therefrom into the conduit 41 under pressure.

From the foregoing description and assuming the tub to be filled with a cleansing liquid, such as water, to the usual normal water level whereby the agitator will be immersed therein, and the fabrics to be cleansed inserted in said tub, it will appear obvious that upon starting the driving power means or electric motor 20, that through the connected shafting and gearing, an oscillatory movement will be imparted to said agitator member 40, whereby the radially disposed liquid impelling surfaces or wings thereof will impart a lateral movement to said liquid, as determined by the speed of the motor 20 and the connecting gearing, first in one and then in an opposite outward direction toward the interior limits of the tub and thereby creating flowing currents of said cleansing liquid in the tub and causing the fabrics circulated thereby to be substantially suspended therein. Also, from the foregoing description, it will be apparent that upon the oscillation of said agitator member 40, the pump 23 will be simultaneously operated to force air through the agitator shaft 35 into the communicating conduit or duct 43 in the agitator 40 and out through the egress openings or passages 44 thereof into the cleansing liquid in the tub. The emitting of said air from the impelling surfaces of the agitator during oscillation thereof tends to desirably urge the circulating fabrics out of substantial contact therewith due to the liberating action of the air being forced therefrom and becoming so co-mingled with the flowing currents of the cleansing liquid produces an aeration of both the liquid and fabrics therein, so that the aerated liquid is forced outwardly, through and around said fabrics, thus effectively aerating and cleansing the same. Also, the buoyant action of the liberated air in the flowing currents of cleansing liquid assists in the active suspensioning of the fabrics therein.

It will be apparent that when it is not desired to actively use said attachment, instead of removing the same wholly from the wash tub, the thumb screws 18 may be loosened, the clamps 17 disengaged with one edge of the side wall of the tub and the entire device then swung to one side about the pivots of the hinges 14.

What I claim is:—

1. An attachment of the class described comprising a supporting frame provided with means for engaging opposite walls of a tub to support the frame transversely of the tub, a platform slidably mounted on the supporting frame, an agitator shaft extending vertically through the platform, bearing means for the agitator shaft, said agitator shaft being hollow, an agitator blade mounted on the lower end of the shaft and having an air passage extending therethrough in line with the agitator shaft, and a discharge passage for the air passage opening at opposite sides of the blade; a pump for supplying air mounted on the platform having a discharge conduit leading therefrom, a swivel connection between said discharge conduit and the upper end of the agitator shaft, and means common to the agitator shaft and said pump for simultaneously driving the same.

2. An attachment of the class described comprising a supporting frame provided with means for engaging opposite walls of a tub to support the frame transversely of the tub, a platform slidably mounted on the supporting frame, an agitator shaft extending vertically through the platform, bearing means for the agitator shaft, said agitator shaft being hollow, an agitator blade mounted on the lower end of the shaft and having an air passage extending therethrough in line with the agitator shaft, and a discharge passage for the air passage opening at opposite sides of the blade; a pump for supplying air mounted on the platform having a discharge conduit leading therefrom, a swivel connection between said discharge conduit and the upper end of the agitator shaft, and means common to the agitator shaft and said pump for simultaneously driving the same, said driving means including means for rotating the agitator shaft first in one direction and then in a reverse direction for oscillating the agitator blade.

3. In a washing machine, comprising driving power means, the combination of a tub for containing a cleansing substance and materials to be cleansed, a liquid agitator dolly mechanism driven by said power means for oscillating said liquid agitator dolly, said agitator dolly having a liquid-impelling surface operative to outwardly impel said cleansing substance and material, conducting means associated with the agitator dolly whereby air may be emitted from a portion of said impelling surface of said agitator dolly during oscillation thereof whereby the cleansing substance and material are co-mingled with said air and means to supply said air to said conducting means of the agitator dolly.

4. In a washing machine, a tub having a bottom wall, an agitator supported to be oscillated above said bottom wall having liquid impelling wings projecting radially therefrom, said wings having egress openings adapted for emitting air, means for supplying said air to said openings and means for oscillating said agitator.

5. An agitator for a washing machine comprising a supporting portion arranged for actuation by an oscillatory mechanism, a plurality of radially disposed liquid impelling wings projecting from said supporting portion, and an air conducting means in communication with said supporting portion and with openings in the impelling surfaces of said wings to provide for the emission of air therefrom.

6. In a washing machine, in combination, a tub, a hollow agitator shaft disposed vertically within said tub, an agitator mounted on said shaft and disposed within said tub near the bottom thereof and having a duct in association therewith communicating with said hollow portion of said shaft and providing a discharge passage in the impelling surfaces of said agitator, means for supplying air to said hollow shaft whereby said air will be emitted from said agitator and means for driving said shaft whereby said agitator will be reciprocated within the tub.

7. In a washing machine, a tub, an oscillating winged dolly formed and arranged to be submerged in water in the tub, and an air supply means in part carried by the dolly arranged to discharge air into the water within the agitated area thereof and in proximity to a wing of the dolly.

8. In a washing machine, a tub, an oscillating winged dolly formed and arranged to be submerged in water in the tub, and an air supply means arranged to discharge air into the water from a point located within a zone defined by the horizontal planes of the upper and lower edges of the dolly.

9. In a washing machine, a tub, an oscillating dolly formed and arranged to be submerged in the water in the tub, the dolly having self-contained air conducting means arranged to discharge air into the agitated water from a point within the latter and in immediate proximity to the dolly.

10. In a washing machine, a tub having bottom and side walls, a bladed agitator, instrumentalities for movably mounting the agitator in the tub and for actuating the same in a horizontal plane in immersed relationship to the water in the tub to impel the water outwardly towards the side of the latter, a forced air supply operatively associated with the agitator having discharge passages to permit emission of air in immediate adjacence to the bladed portion of the dolly to commingle with the water agitated thereby.

11. In a washing machine, a tub, a dolly adapted to be submerged in the water in the tub, means for actuating the dolly to correspondingly agitate the water and its contents, said dolly having means for discharging air outwardly from the dolly into said agitated water and contents.

12. In a washing machine, a tub, a winged dolly adapted to be submerged in the water in the tub, means for actuating the dolly in a horizontal plane to correspondingly agitate the water and move its contents, and means for forcibly discharging air into the water at points between the said dolly and contents.

13. In a washing machine, a tub, and a combined agitating and air supply device adapted to be submerged in the water in the tub, including a dolly and air conduit adapted to discharge at a point in adjacence to the dolly, means for actuating the dolly to correspondingly agitate the water and its contents, and means for forcing air through the air conduit and within said agitated water and contents.

14. In a washing machine, a tub, a winged dolly adapted to be submerged in the water in the tub, means for actuating the dolly in a horizontal plane to correspondingly agitate the water and its contents, the dolly being provided with an air conduit carried thereby and disposed in part approximately vertically thereof, and means for forcing the air through said conduit, the conduit being provided with openings adapted to discharge outwardly from the dolly into said agitated water and contents.

15. In a washing machine, a tub, an agitator structure comprising a dolly, supporting means for maintaining the same in submerged position near the bottom of the tub, and actuating means for said dolly, a portion of the agitator structure being hollow to afford an air conduit therein and the dolly having discharge openings in communication with said air conduit, and means for forcibly supplying air to said conduit whereby air will be jetted through the said discharge openings away from the dolly into the agitated water and the contents thereof adjacent to the dolly.

16. In a washing machine, a tub, a dolly adapted to be submerged in the water in the tub, means for maintaining the dolly in position near the bottom of the tub, means for actuating the dolly in a rotary direction horizontally of the tub to correspondingly agitate the water and its contents, and air delivery and discharge means operatively associated with the dolly arranged to emit air outwardly through the dolly and into said agitated water and contents.

17. In a washing machine, a tub, a dolly adapted to be submerged in the water in the tub, movable air discharging means within, and opening to, the water, and instrumentalities for oscillating the dolly to impart a washing action to the water in the tub, and for moving the air discharging means in keeping with the oscillation of the dolly.

18. In a washing machine, a tub, and a unitary agitating and aerating device comprising a dolly mounted to occupy a submerged relation to the water in the tub and having air discharge openings within the water zone, in combination with means for actuating the device to create a washing aerated action of the water while simultaneously shifting said discharge openings within the water zone.

19. In a washing machine, a tub having bottom and side walls, a bladed agitator, instrumentalities for movably mounting the agitator in the tub and for actuating the same in a horizontal plane in immersed relationship to the water in the tub to impel the water outwardly towards the side of the latter, a forced air supply operatively associated with the agitator having a discharge passage to permit emission of air in immediate adjacence to the bladed portion of the dolly to commingle with the water agitated thereby.

JOSEPH F. BRENNAN.